United States Patent

Harada et al.

[11] Patent Number: 5,695,883
[45] Date of Patent: Dec. 9, 1997

[54] CARBON MEMBER HAVING A METAL SPRAY COATING

[75] Inventors: Yoshio Harada; Junichi Takeuchi; Shigeki Okunishi, all of Hyogo; Tetsuro Tojo, Kyoto; Jiro Hiraiwa; Koji Kuroda, both of Osaka, all of Japan

[73] Assignees: Tocalo Co., Ltd., Kobe; Toyo Tanso Co., Ltd., Osaka, both of Japan

[21] Appl. No.: 741,399

[22] Filed: Oct. 29, 1996

Related U.S. Application Data

[63] Continuation of Ser. No. 278,627, Jul. 20, 1994, abandoned, which is a continuation of Ser. No. 944,965, Sep. 15, 1992, abandoned.

[30] Foreign Application Priority Data

Sep. 17, 1991 [JP] Japan .................... 3-262566

[51] Int. Cl.$^6$ .................... B32B 9/00
[52] U.S. Cl. .................... 428/408; 427/446; 427/453; 427/454; 427/455; 428/156; 428/161; 428/164; 428/212; 428/332; 428/457; 428/469
[58] Field of Search .................... 428/408, 457, 428/332, 156, 161, 164, 212, 698, 699, 697, 701; 427/446, 453, 454, 455

[56] References Cited

U.S. PATENT DOCUMENTS

| | | |
|---|---|---|
| 3,085,317 | 4/1963 | Stackhouse . |
| 3,348,929 | 10/1967 | Valtschev et al. .................... 29/180 |
| 3,476,586 | 11/1969 | Valtschev et al. .................... 428/408 |
| 3,553,010 | 1/1971 | Rubisch et al. .................... 117/217 |
| 3,849,080 | 11/1974 | Zechmeister .................... 425/408 |
| 3,915,508 | 10/1975 | Hooton et al. .................... 428/408 |
| 4,772,514 | 9/1988 | Neufuss et al. .................... 428/408 |
| 4,915,494 | 4/1990 | Shipley et al. .................... 428/408 |

FOREIGN PATENT DOCUMENTS

| | | |
|---|---|---|
| 1277578 | 11/1961 | France . |
| 1350772 | 12/1962 | France . |
| 1481199 | 4/1966 | France . |
| 1962036 | 6/1971 | Germany . |
| 2503374 | 5/1976 | Germany . |
| 50-55540 | 5/1975 | Japan . |
| 58-37171 | 3/1983 | Japan . |
| 60-224771 | 11/1985 | Japan . |
| 60-30657 | 2/1986 | Japan . |
| 62-113782 | 5/1987 | Japan . |
| 1145386 | 6/1989 | Japan . |
| 0459978 | 2/1992 | Japan . |
| 4139084 | 5/1992 | Japan . |

*Primary Examiner*—Archene Turner
*Attorney, Agent, or Firm*—Dvorak & Orum

[57] ABSTRACT

A carbon member having an excellent bonding property is provided at its surface with a metal spray coating layer, and comprises a carbon substrate and a spray coating layer made from at least one metal selected from Cr, Ti, V, W, Mo, Zr, Nb and Ta or an alloy thereof, in which the coating layer has a ratio of linear expansion coefficient to carbon of 0.73–1.44 and a large chemical affinity to carbon at its interface.

15 Claims, 2 Drawing Sheets

FIG_2
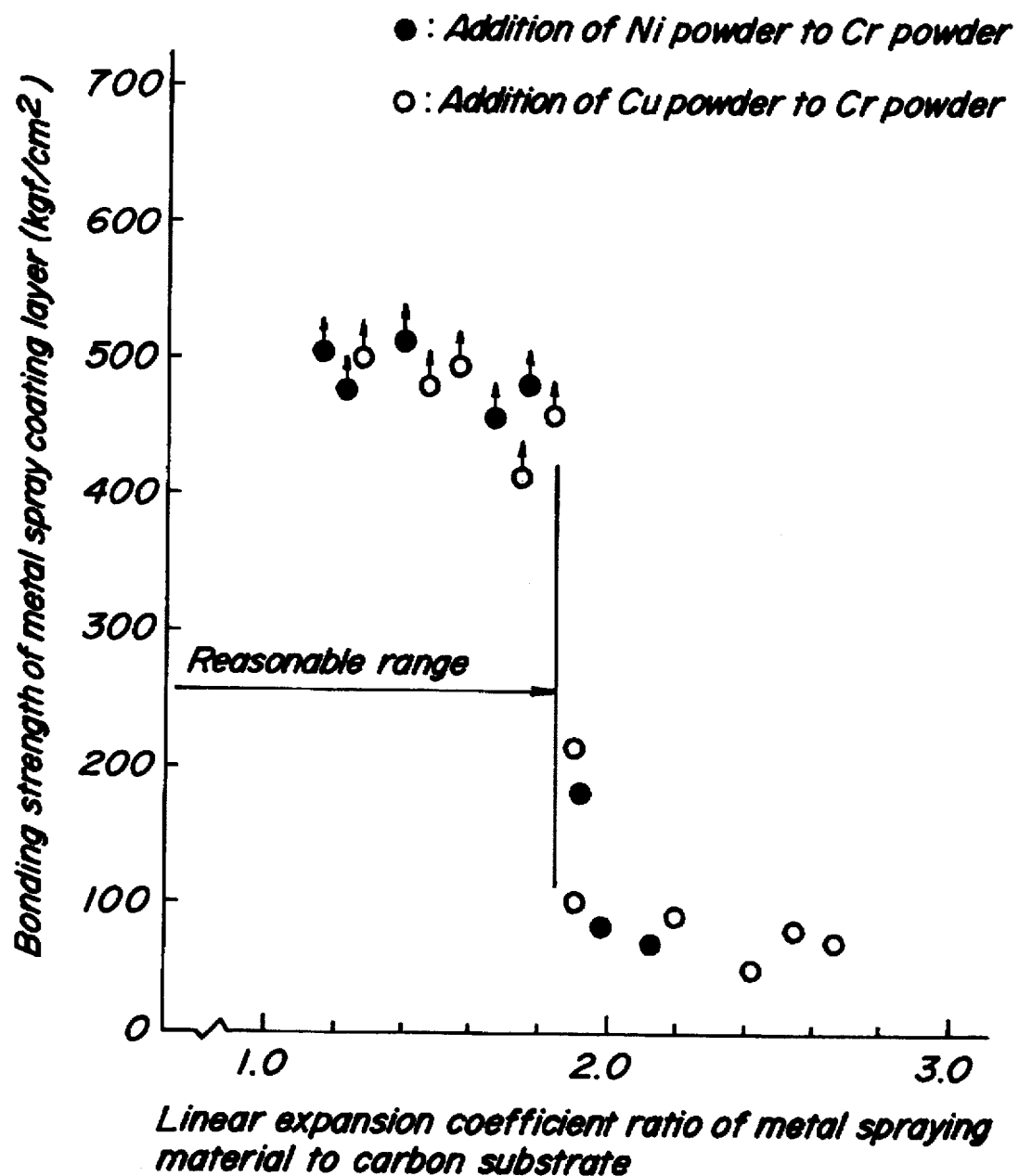

CARBON MEMBER HAVING A METAL SPRAY COATING

This application is a continuation of application Ser. No. 08/278,627, filed 20 Jul. 1994 now abandoned, which is a continuation of application Ser. No. 07/944,965, filed 15 Sep. 1992 now abandoned.

BACKGROUND OF THE INVENTION

1. Field of the Invention

This invention relates to a carbon member provided at its surface with a metal spray coating having an excellent adhesion property, and more particularly to carbon members suitable for use in various rolls made from sintered carbon, metal or vitreous crucibles, various cells, electrodes for electrolysis, structural members for flying objects, heating bodies and sport and leisure goods such as tennis racket, golf club, fishing rods and the like.

2. Disclosure of the Related Art

The carbon products are light in the weight, excellent in the thermal stability, excellent thermal and electrical conductivities though they are non-metal, and have mechanical strengths under high temperature environment higher than those of iron steel in the fiber-shaped products, so that they are widely used in up-to-date industrial fields such as chemistry, fiber, high polymer, metal refining, ceramics and the like.

However, the carbon products are poor in the wear resistance and low in the bonding force to metals, so that it is required to eliminate these drawbacks by combining with the other materials.

As the conventional countermeasure for overcoming the above drawbacks produced in the carbon products, carbon has hither to been combined with another different materials such as high polymers, metals or the like. Lately, there is noticed metal coating formed by electroplating process, chemical plating process, physical vapor deposition process (PVD), chemical vapor deposition process (CVD), spraying process or the like. Up to the present, however, the electroplating process, chemical plating process, PVD process and CVD process are critical in accordance with the shape and size of the product, and also the resulting metal coating layer is relatively thin in the thickness and can not sufficiently develop the functions as the metal coating layer.

In the method of forming the metal coating layer by the spraying process, the restriction in accordance with the shape and size of the product is less and also the optional metal can freely be thickened as compared with the other methods for the formation of the metal coating layer. For instance, the method described in Japanese Patent laid open No. 60-221591 has taken notice of such advantages and proposed a method of forming a metal layer onto a contact surface of a current collecting member of a carbon electrode by the spraying process. In this conventional technique, at least one of Sn, Pb, Zn, Cu, Ag, Al, Ni, Fe, stainless steel, brass, bronze, monel metal and the like is used as a spraying materials and spray coated by an electric arc type spraying process to form a carbon electrode. In this technique, however, when using plasma spraying process or detonation flame spraying process, the carbon product is undesirably oxidized or broken by a spraying heat source.

In the method of spraying metal onto a surface of a carbon member through the electric arc spraying process described in Japanese Patent laid open No. 60-221591, there are problems that (1) the spraying material is restricted to a soft metal capable of working to a wire and hence a metal suitable for the joining to carbon may not be used, and (2) the joining strength of the spraying metal recommended by the conventional technique to carbon is weak, and (3) the coating work speed is slow and the operation efficiency is poor because of the electric arc spraying process.

SUMMARY OF THE INVENTION

It is, therefore, an object of the invention to establish a technique effective for obtaining carbon products having a strong bonding strength between metal spray coating layer and carbon material as a substrate and developing excellent composite functions without causing the above problems.

The inventors have made various studies in order to achieve the above object and found that the considerable effect of solving the above problems is obtained when the surface of the carbon product is preliminarily subjected to a blast treatment with alumina and then sprayed with a metal having a linear expansion coefficient near to that of carbon and a strong chemical affinity to carbon or an alloy thereof or a mixture with another metal, alloy, ceramic or the like, and as a result the invention has been accomplished.

According to the invention, there is the provision of a carbon member provided at its surface with a metal spray coating layer having an excellent bonding property, comprising a carbon substrate previously subjected to a blast treatment and a spray coating layer formed on a surface thereof and made from at least one metal selected from Cr, Ti, V, W, Mo, Zr, Nb and Ta or an alloy thereof, said coating having a ratio of linear expansion coefficient to carbon of 0.73–1.44 and a large chemical affinity to carbon at its interface.

In a preferred embodiment of the invention, the metal spray coating layer is further provided at its surface with a spray coating of a metal having a ratio of linear expansion coefficient of more than 1.44 or a non-metallic compound having a ratio of linear expansion coefficient of less than 0.73, or the carbon member is provided at its surface with a metal coating layer formed by adding Ni, Al, Cu, Co or iron alloy having a ratio of-linear expansion coefficient of not more than 1.85 to the metal or alloy to be sprayed and spraying at a mixed state or alloyed state.

BRIEF DESCRIPTION OF THE DRAWINGS

The invention will be described with respect to the accompanying drawings, wherein:

FIG. 2 is a graph showing a relation between apparent ratio of linear expansion coefficient and bonding strength of metal coating layer when Cr powder is mixed with Ni powder or Cu powder at an optional ratio and applied onto a sintered carbon substrate by an atmospheric plasma spraying process.

DESCRIPTION OF THE PREFERRED EMBODIMENTS

Figure 1:
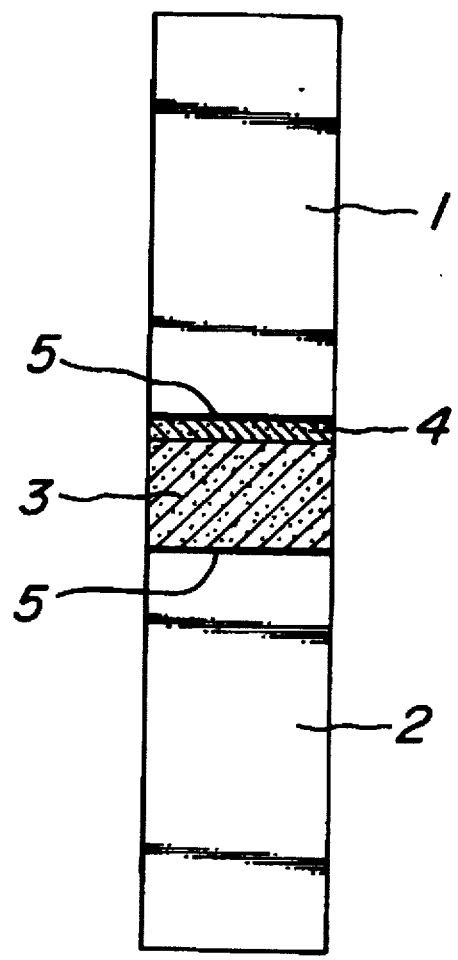
FIG. 1 is a sectional view showing a method for measuring a bonding strength of a metal spray coating layer formed on a sintered carbon substrate.

According to the invention, the reason why a material of spraying metal to be applied onto a surface of a carbon substrate is restricted to Cr, Ti, V, N, Mo, Zr, Nb, Ta and an alloy thereof is due to the fact that the linear expansion coefficient of these metals or alloy is within a range of 4.5 to $8.9 \times 10^{-6}$/°C. (room temperature to 100° C.) and is near to that of the carbon substrate (4.2 to $6.5 \times 10^{-6}$/°C.: room temperature to 100° C.).

In general, when different materials are joined to each other, if there is a difference in the linear expansion coefficient between both the materials, shearing stress is caused at the joint face in accordance with the temperature change or the like in use, and if such a stress exceeds the joining strength, both the materials are peeled off from each other.

As the spraying metal used in the invention, at least one metal or alloy having a linear expansion coefficient of $4.5 \times 10^{-6}/°C$. to $8.9 \times 10^{-6}/°C$. is used. These metals and alloys are characterized by having a small difference to the linear expansion coefficient of carbon substrate.

A ratio of the linear expansion coefficient of the metal to linear expansion coefficient of carbon substrate ($6.2 \times 10^{-6}/°C$.), i.e linear expansion coefficient ratio (metal/carbon) is within a range of 0.73–1.44 as seen from Table 1.

TABLE 1

| ($\times 10^{-6}/°C$., room temperature to 100° C.) | | | | | | | | |
|---|---|---|---|---|---|---|---|---|
| | Metal | | | | | | | |
| | Cr | Ti | V | W | Mo | Zr | Nb | Ta |
| Linear expansion coefficient | 6.5 | 8.9 | 8.3 | 4.5 | 5.1 | 5.0 | 7.2 | 6.5 |
| Linear expansion coefficient ratio | 1.05 | 1.44 | 1.34 | 0.73 | 0.82 | 0.81 | 1.16 | 1.05 |

Therefore, if two or more of these metals are mixed or alloyed for use in the spraying materials, the linear expansion coefficient of the mixture or alloy is sufficient to be within a range of $0.45-1.85 \times 10^{-6}/°C$., preferably $0.73-1.44 \times 10^{-6}/°C$.

Although a metal or alloy having a linear expansion coefficient of more than 1.59 such as Ni, Al, Cu, Fe alloy (stainless steel) or the like is not a spraying material according to the invention, it may be mixed with the above spraying material (Cr, Ti, etc.) for the spray coating. In the latter case, the ratio of the linear expansion coefficient of the metal or alloy mixture to the linear expansion coefficient of the carbon substrate should be not more than 1.85.

The peeling phenomena at the joint portion due to the thermal expansion difference can be prevented as long as the above linear expansion coefficient ratio is maintained.

In the spraying metal or alloy according to the invention, it is required to have an excellent chemical affinity to carbon. That is, fine particles of the metal, alloy or the like fly toward the surface to be coated at a molten state during the spraying and collide with the surface of the carbon substrate to form a coating layer. In this case, it has been found that the metal or alloy takes a lamination structure physically bonded to the substrate and also is bonded thereto through strong chemical affinity.

In general, it is known that the intensity of chemical affinity between metal and carbon has the following order, from which it is apparent that all of the metals according to the invention have strong affinity.

Nb>Ti>V>W>Mo>Cr>Mn>Fe>Ni>Co>Si

Moreover, the metals and alloys according to the invention have a side that they are easily oxidized by oxygen under a high temperature spraying environment. However, the resulting oxides are low in the sublimation temperature (for example, sublimation temperature of each oxide $MO_3$:795° C., $WO_3$:1000° C., $Nb_2O_5$, $Ta_2O_5$; not lower than 1370° C.), and evaporate very easily in the spraying heat source such as plasma, combustion gas or the like. Therefore, when they collide with the carbon substrate, the oxide film formed on the surface of the metal particle becomes fine and hence the bonding strength of the coating layer is improved without obstructing the chemical affinity to carbon. Moreover, a slight amount of oxide film retained without evaporation is microscopically removed by reduction reaction.

In the carbon member according to the invention, after the spray coating layer of the above metal or alloy is formed, a metal having a linear expansion coefficient of more than 1.85 such as Ni, Al, Cu, Ca or the like may be sprayed thereon to form a multilayer-like coating layer.

Alternatively, ceramics such as $Al_2O_3$, $ZrO_2$, $TiO_2$, $Cr_2O_3$, WC, TiC, $Cr_3C_2$ and the like or cermet material thereof, which have a linear expansion coefficient smaller than 0.73, may be sprayed to form a multi-layer like coating layer.

According to the invention, many kinds of the metal, alloy, ceramics and the like may be coated onto the surface of the carbon substrate. In this meaning, the invention is expected to be applied to various industrial fields and is considerably large in the industrial merit.

In the invention, the thickness of the metal spray coating is desirable to be 0.05–5 mm on the surface of the carbon substrate. When the thickness is less than 0.05 mm, the effect of the metal coating layer can not sufficiently be developed, while when it exceeds 5 mm, the operation takes a long time and the amount of metal consumed becomes large and disadvantageous in the economical reasons.

If the material having a linear expansion coefficient larger than the above defined range or the material having a linear expansion coefficient smaller than the above defined range is sprayed to form a multi-layer like coatings, the thickness of the metal spray coating as an under layer may be thinned.

In the production of the metal spray coating layer obtained by spraying the metal or alloy according to the method of the invention, plasma, combustion gas flame, explosion energy or the like may be used as a spraying heat source. Further, the spraying may be conducted in atmosphere or an argon gas environment under a low pressure as a spraying atmosphere.

According to such a spraying method, the coating metal or alloy may be rendered into a linear or powdery form, so that metals suitable for the joining to carbon such as metals of Cr or the like not capable of working into the linear form and metals of Nb, Ta, W hardly working into the linear form or very high in the cost even in the working can be used freely.

In the invention, the metal spraying material of powdery state may be used, so that different metals may be mixed at an optional mixing ratio to form a metal spray coating layer for various applications.

Moreover, when such spraying powdery materials passed through a high temperature plasma flame even at the mixed state, the powdery materials are rendered into a molten state containing a large amount of metal completely alloyed through metallurgical reaction and adhered to the surface of the carbon substrate, which largely contributes to the improve the bonding strength of the coating layer according to the invention.

As mentioned above, the metal spray coating layer having an excellent bonding property is formed on the surface of the carbon substrate.

The following examples are given in illustration of the invention and are not intended as limitations thereof.

EXAMPLE 1

A high density carbon sintered body of a discontinuous layer structure (width 50×length 100×thickness 10 mm) was used as a test mother material. It was first subjected to a blasting treatment with $Al_2O_3$ (# 60) and further at the surface thereof to an electric arc spraying process, a powdery spraying process using oxygen.acetylene combustion flame as a heat source (flame spraying), an atmospheric plasma spraying process mainly using argon gas (atmospheric plasma spraying), or a spraying process in which plasma as a heat source is used in an atmosphere adjusted to 100–200 mbar with argon gas after the removal of air (low-pressure plasma spraying), whereby various spraying materials shown in table 2 were spray-coated at a thickness of 150 μm. Thereafter, a circular specimen of 25 mm in diameter was cut out from a carbon sintered body provided with the resulting metal spray coating and subjected to a method of measuring bonding strength as shown in FIG. 1 to measure the bonding property between the metal spray coating layer and carbon substrate. In FIG. 1, numerals 1, 2 are fixing jigs of carbon steel, numeral 3 a sintered carbon body, numeral 4 a metal spray coating layer, and numeral 5 a joint portion with a synthetic resin adhesive.

The measurement of the bonding property was carried out by providing two carbon steel (SS400) jigs of 25 mm in diameter and 80 mm in length, applying a thermosetting epoxy resin to each end portion of the jigs, pushing the carbon specimen provided with the metal spray coating layer onto the resin surfaces between the jigs, and balking the resin through heating at 150° C. for 90 minutes.

The measured results on the bonding strength of the metal spray coating layer in accordance with the spraying material are shown in Table 2.

means of an optical microscope, the peeling was almost caused at an interface between the metal spray coating layer and the carbon substrate.

In the metal spray coating layers having a very small bonding strength (Nos. 9, 12, 13, 15), when the section of the spray coated portion in these layers before the tensile test or immediately after the spraying was observed by means of an optical microscope, the metal spray coating layer was at a state just before the peeling from the carbon substrate, or the interface between the metal spray coating layer and the carbon substrate was completely peeled though the abnormal appearance was not observed.

On the contrary, all of the metal spray coating layers according to the invention (Nos. 1–8) showed a bonding strength of not less than 300 $kgf/cm^2$. Furthermore, the breaking was observed in the vicinity of the central portion of the carbon substrate, but the interface between the metal spray coating layer and the carbon substrate showed a good bonding property. As seen from this result, the bonding strength of the metal spray coating layer according to the invention became larger than the tensile strength of the carbon substrate itself (470 $kgf/cm^2$).

Among the above spraying processes, a linear metal was used in the arc spraying process, but metal wire of Cr, V, W, Nb, Ta or the like was not commercially available (which could not be produced technically or economically), so that each of these metals was used in form of powder, from which the metal spray coating layer was formed by the other spraying process.

As the spraying process according to the invention, it has been found that the low-pressure spraying process shows a best bonding property, but the excellent bonding strength was provided even in the atmosphere spraying process and other spraying processes. That is, as seen from the above

TABLE 2

| | No. | Coating metal | Ratio of linear expansion coefficient | Spraying process | | | | peeling |
| | | | | arc spraying | flame spraying | atmosphere plasma spraying | low-pressure plasma spraying | |
| --- | --- | --- | --- | --- | --- | --- | --- | --- |
| Acceptable | 1 | Cr | 1.05 | — | 470 | 470 | 470 | o |
| Example | 2 | Ti | 1.44 | 350 | 320 | 335 | 405 | o |
| | 3 | V | 1.34 | — | 320 | 350 | 450 | o |
| | 4 | W | 0.73 | — | — | 405 | 430 | o |
| | 5 | Mo | 0.82 | 310 | — | 380 | 420 | o |
| | 6 | Zr | 0.81 | — | 280 | 380 | 405 | o |
| | 7 | Nb | 1.16 | — | — | 390 | 420 | o |
| | 8 | Ta | 1.05 | — | — | 470 | 470 | o |
| Comparative | 9 | Al | 3.80 | 55 | 35 | 18 | 20 | x |
| Example | 10 | Co | 2.02 | 65 | 40 | 58 | 60 | x |
| | 11 | Fe | 1.95 | 140 | 130 | 145 | 180 | x |
| | 12 | Ni | 2.15 | 35 | 38 | 42 | 51 | x |
| | 13 | Cu | 2.74 | 28 | 25 | 25 | 20 | x |
| | 14 | Zn | 5.00 | 35 | 41 | 20 | 20 | x |
| | 15 | Stainless steel | 2.58 | 30 | 41 | 28 | 22 | x |

[Note]
—: not conducted
o: no peeling
x: peeling occurred

As seen from the results of Table 2, the bonding strength in all of the acceptable examples exceeded 300 $kgf/cm^2$, while the bonding strength in the metal spray coating layer as a comparative example was very low and the peeling was caused at a bonding strength of less than 200 $kgf/cm^2$. Furthermore, when the peeled portion was observed by test, the bonding property is largely influenced by the kind of the spraying metal rather than the kind of the spraying process.

EXAMPLE 2

Onto the same carbon substrate as in Example 1 was formed a metal spray coating layer of 150 μm in thickness by mixing two or more metal powders at a mixing ratio as shown in Table 3 and then spraying the resulting mixture through atmosphere plasma spraying process, and thereafter the bonding strength of the metal spray coating layer was measured by the same method as in Example 1.

The measured results are shown in Table 3. As seen from Table 3, all of the metal spray coating layers in the comparative examples showed a bonding strength of not more than 40 kgf/cm$^2$, while all of the metal spray coating layers according to the invention were sound and excellent in the bonding strength though the substantially neighborhood of the central portion of the carbon substrate was broken likewise Example 1. From these results, it has been found that the metal spray coating layer according to the invention has a strong bonding strength even if the metals are used alone or in admixture.

TABLE 3

| No. | Spraying metals (weight ratio) | Bonding strength (kgf/cm$^2$) |
| --- | --- | --- |
| Acceptable Example | | |
| 1 | Cr(80)—Ti(20) | 385 |
| 2 | Cr(60)—Mo(40) | 395 |
| 3 | Nb(80)—Ta(20) | 405 |
| 4 | Cr(60)—Ta(20)—Nb(20) | 420 |
| 5 | Cr(40)—W(10)—Nb(30)—Ta(20) | 410 |
| Comparative Example | | |
| 6 | Ni(80)—Cu(20) | 40 |
| 7 | Co(40)—Ni(40)—Fe(20) | 38 |
| 8 | Cu(80)—Zn(15)—Al(5) | 27 |

EXAMPLE 3

In this example, Ni or Cu powder unsuitable as a metal material according to the invention was mixed with Cr powder suitable as a metal material according to the invention at an optional mixing ratio to form a mixed spraying material, which was sprayed through atmosphere plasma spraying process to form a metal spray coating layer. The bonding strength of the resulting metal spray coating layer was measured by the same method as in Example 1.

In FIG. 2 is shown a relation between the linear expansion coefficient ratio of metal spray coating layer having a different mixing ratio to carbon substrate and the bonding strength of metal spray coating layer, wherein an arrow shows a measured value of bonding strength when the central portion of the carbon substrate is broken, and an arrow portion shows the average bonding strength of the metal spray coating layer higher than the measured value. Furthermore, each mark shows the bonding strength of the metal spray coating layer formed by adding Ni powder or Cu powder to Cr powder.

As seen from the results of FIG. 2, when Cr as a metal suitable for the invention is mixed with 10–99 wt % of Ni or 15–99 wt % of Cu as a metal unsuitable for the invention, if the mixing ratio is small, the high bonding strength is obtained.

On the other hand, the bonding strength tends to lower as the linear expansion coefficient ratio increases together with the high mixing ratio of Ni or Cu. That is, the linear expansion coefficient ratio of the metal spray coating layer to the carbon substrate is critical to be 1.85, so that it has been confirmed that the metal spray coating layer made from the alloy having the mixing ratio of Cr/Ni or Cu lower than the above value shows a high bonding strength.

As mentioned above, the metal spray coating layer made from the metal or alloy having a linear expansion coefficient ratio to carbon of 0.73–1.44, or from a mixture with another material having a linear expansion coefficient ratio of not more than 1.85 has a bonding strength to the sintered carbon substrate stronger than the bonding strength of carbon particle. Therefore, according to the invention, the joining property of the carbon substrate to abrasion-resistant metallic member, which has not been attained in the conventional technique, can be improved while maintaining the properties of the carbon substrate. Furthermore, according to the invention, it is possible to produce carbon members coated with various ceramics, and the formation of the ceramic insulation coating is easy together with the improvement of the appearance, so that the invention develops large effects on the improvement of the properties as a carbon product and the enlargement of applications.

What is claimed is:

1. A carbonaceous substrate member having a surface provided with a metallic spray coating layer deposited through a heat source spraying process, said coating having an excellent bonding property to carbon, comprising a carbonaceous substrate having the surface previously subjected to an alumina blasting treatment and a spray coating layer physically bonded directly to said blasted surface of the substrate and consisting of at least one metal selected from the group consisting of Nb, Ti, V, Zr, Ta, W, Mo, and Cr and wherein each of said metals in said group and said substrate each has a respective coefficient of linear expansion and wherein a composition of said coating layer is such that when said coefficient of said metallic layer is divided by said coefficient of said substrate, a ratio is formed, wherein when said ratio is limited to a value between 0.73 and 1.44, said layer will permanently bond to said substrate.

2. A carbon member according to claim 1, wherein said carbon member is further provided on top of the metal spray coating layer with another spray coating of a metal, the ratio of linear expansion coefficient of said another spray coating to that of the carbon substrate being more than 1.44.

3. A carbon member according to claim 1, wherein said carbon member is further provided on top of the metal spray coating layer with another spray coating of a non-metallic compound, the ratio of linear expansion coefficient of said another spray coating to that of the carbon substrate being less than 0.73.

4. The carbon member of claim 1 wherein said selected metals are easily oxidized when exposed to high temperatures.

5. The carbon member of claim 4 wherein said selected metals have oxides that have a low sublimination temperature when exposed to high temperatures.

6. The carbon member of claim 5 wherein said bonding strength is preferably about 400 kgf/cm$^2$.

7. The carbonaceous substrate member of claim 1, wherein each of said alloys has an oxidation temperature at which oxides of said alloys form thereon, said oxides respectively having a low sublimination temperature relative to said heat source such that said heat source causes said oxides to first form on said alloy and then to evaporate therefrom before said alloy is sprayed against said substrate, thereby allowing said alloy to chemically bond to said substrate with an unobstructed chemical affinity thereto in elemental form, rather than compound form.

8. A carbon member provided at its surface with a metal spray coating layer having an excellent bonding property to carbon, comprising a carbon substrate having the surface previously subjected to blasting treatment and a spray coating layer formed on the thus blasted surface of the carbon substrate and consisting of a combination of one metal selected from Nb, Ti, V, Zr or an alloy of two or more of Nb, Ti, V and Zr and another metal selected from Ni, Cu, Co or an iron alloy, the ratio of linear expansion coefficient of said spray coating layer to that of the carbon substrate being not more than 1.85, the combination of metals or alloys being sprayed in a mixed state or an alloy state and the thickness of said spray coating layer ranging from 0.05 to 5 mm.

9. A carbonaceous substrate member having a surface provided with a metallic spray coating layer through a heat source spraying process, said coating having an excellent bonding property to carbon, comprising a carbonaceous substrate having the surface previously subjected to an alumina blasting treatment and a spray coating layer physically bonded directly to said blasted surface of the substrate and consisting of at least one metal selected from a first group consisting of Cr, Ti, V, W, Mo, Zr, Nb, and Ta and another metal selected from a second group consisting of Ni, Al, Cu, Co, or an iron alloy and wherein each of said metals in each of said groups has a respective coefficient of linear expansion, and wherein a composition of said coating layer is such that when said coefficient of linear expansion of said metallic layer is divided by said coefficient of linear expansion of said substrate, a ratio is formed, wherein when said ratio is limited to a value between 0.73 and 1.85, said layer will permanently bond to said substrate.

10. A carbon member according to claim 9, wherein said carbon member is further provided on top of the metal spray coating layer with another spray coating of a metal, the ratio of linear expansion coefficient of said another spray coating to that of the carbon substrate being more than 1.44.

11. A carbon member according to claim 9, wherein said carbon member is further provided on top of the metal spray coating layer with another spray coating and a non-metallic compound, the ratio of linear expansion coefficient of said another spray coating to that of the carbon substrate being less than 0.73.

12. A carbon member provided at its surface with a metal spray coating layer having an excellent bonding property to carbon, comprising a carbon substrate having the surface previously subjected to blasting treatment and a spray coating layer formed on the thus blasted surface of the carbon substrate and consisting of a combination of at least two metals selected from Cr, Ti, V, W, Mo, Zr, Nb, Ta or an alloy of two or more of Cr, Ti, V, W, Mo, Zr, Nb and Ta and another metal selected from Ni, Cu, Co or an iron alloy, the ratio of linear expansion coefficient of said spray coating layer to that of the carbon substrate being not more than 1.85, the combination of metals or alloys being sprayed in a mixed state and the thickness of said spray coating layer ranging from 0.05 to 5 mm.

13. A method of forming a metallic coating bonded in a layer form to a carbonaceous substrate, said carbon substrate having a coefficient of linear expansion between $4.2\text{--}6.5 \times 10^{-6}/°C$. at a room temperature of 100° C., said method comprising the steps of:

pretreating said carbon substrate to an alumina sandblasting;

providing a metal to be bonded to said substrate, said metal being provided in powder form and selected from the group consisting of Cr, Ti, V, W, Mo, Zr, Nb, and Ta, wherein each of said metals has a respective coefficient of linear expansion close to that of said substrate such that when said coefficient of said metal is divided by said coefficient of said carbonaceous substrate, a ratio is formed, wherein said ratio has a value between 0.73 and 1.44, and where each of said metals within said group has an oxidation temperature at which oxides of said metal form thereon and said oxides have a sublimination temperature relative to said heat source;

bonding said chosen metal to said substrate by impacting said powdered metal against said substrate in the presence of a heat source, said heat source supplied by one of a plasma and flame spraying process, said plasma spraying process proceeding in one of an air and low-pressure argon atmosphere, wherein said heat source causes said metal oxides to form on said metal and then to evaporate therefrom before said powdered metal is impacted against said carbonaceous substrate, thereby allowing said metal to chemically bond to said substrate with an unobstructed chemical affinity thereto.

14. The method of forming a metallic coating as claimed in claim 13, further including the step of applying a second layer of material on top of said bonded metallic layer, said second layer comprising a second metal selected from the group consisting of Ni, Al, Cu, Ca, Zr, Sn, Pb, Ag, stainless steel, wherein each of said second metals respectively having a coefficient of linear expansion that is greater than that of said carbonaceous substrate such that when said coefficient of said second metal is divided by said coefficient of said carbonaceous substrate, a ratio is formed, wherein said ratio has a value generally greater than 1.85.

15. The method of forming a metallic coating as claimed in claim 13, further including the step of applying a second layer of material on top of said bonded metallic layer, said second layer comprising a ceramic selected from the group consisting of $Al_2O_3$, $ZrO_2$, $TiO_2$, $Cr_2O_3$, WC, TiC, and $Cr_3C_2$, wherein each of said ceramic materials respectively have a coefficient of linear expansion that is greater than that of said carbonaceous substrate such that when said coefficient of said ceramic material is divided by said coefficient of said carbonaceous substrate, a ratio is formed, wherein said ratio always has a value generally less than 0.73.

* * * * *